United States Patent [19]

Stamp

[11] 4,289,193
[45] Sep. 15, 1981

[54] ACCUMULATOR PLATE ASSEMBLY METHODS

[76] Inventor: Thomas B. Stamp, "Laurentides", Haymes Rd., Cleeve Hill, Cheltenham, Gloucestershire, England

[21] Appl. No.: 52,011

[22] Filed: Jun. 25, 1979

[30] Foreign Application Priority Data

Jun. 23, 1978 [GB] United Kingdom ............... 27779/78

[51] Int. Cl.³ .................... B22D 19/04; B22D 23/04; B22D 25/04
[52] U.S. Cl. .................................. 164/109; 164/333; 164/DIG. 1
[58] Field of Search .......... 164/108, 109, 333, DIG. 1

[56] References Cited

U.S. PATENT DOCUMENTS

| | | | |
|---|---|---|---|
| 3,616,845 | 11/1971 | Farmer | 164/108 X |
| 3,718,174 | 2/1973 | Hull et al. | 164/333 X |
| 3,802,488 | 4/1974 | Hull et al. | 164/108 X |
| 4,108,417 | 8/1978 | Simonton et al. | 164/133 X |
| 4,175,725 | 11/1979 | Cattano | 164/DIG. 1 |

Primary Examiner—R. L. Spruill
Assistant Examiner—J. Reed Batten, Jr.
Attorney, Agent, or Firm—Young & Thompson

[57] ABSTRACT

Method of connecting a battery plate to a battery strap or post in a mould 50 provided with a number of separate mould cavities 51 arranged on each side of a duct or channel 52 for receiving molten lead. Between each mould cavity 51 and the channel 52 is positioned a weir or barrier 60 which determines the level of lead in each cavity. Lead pumped into the channel 52 flows into the cavities 51 over the weirs 60, the level of lead in channel 52 then drops below the top of the weirs 60 so that the level of lead in the cavities 51 falls to the level of the top of the weirs 60. The lugs 22 of battery plates 23 are then dipped into the lead in the cavities and the lead solidifies to form finished straps or posts. During the moulding process the lead is maintained in a molten state using heaters 78 and the mould cavities are cooled with a flow of cooling water.

1 Claim, 8 Drawing Figures

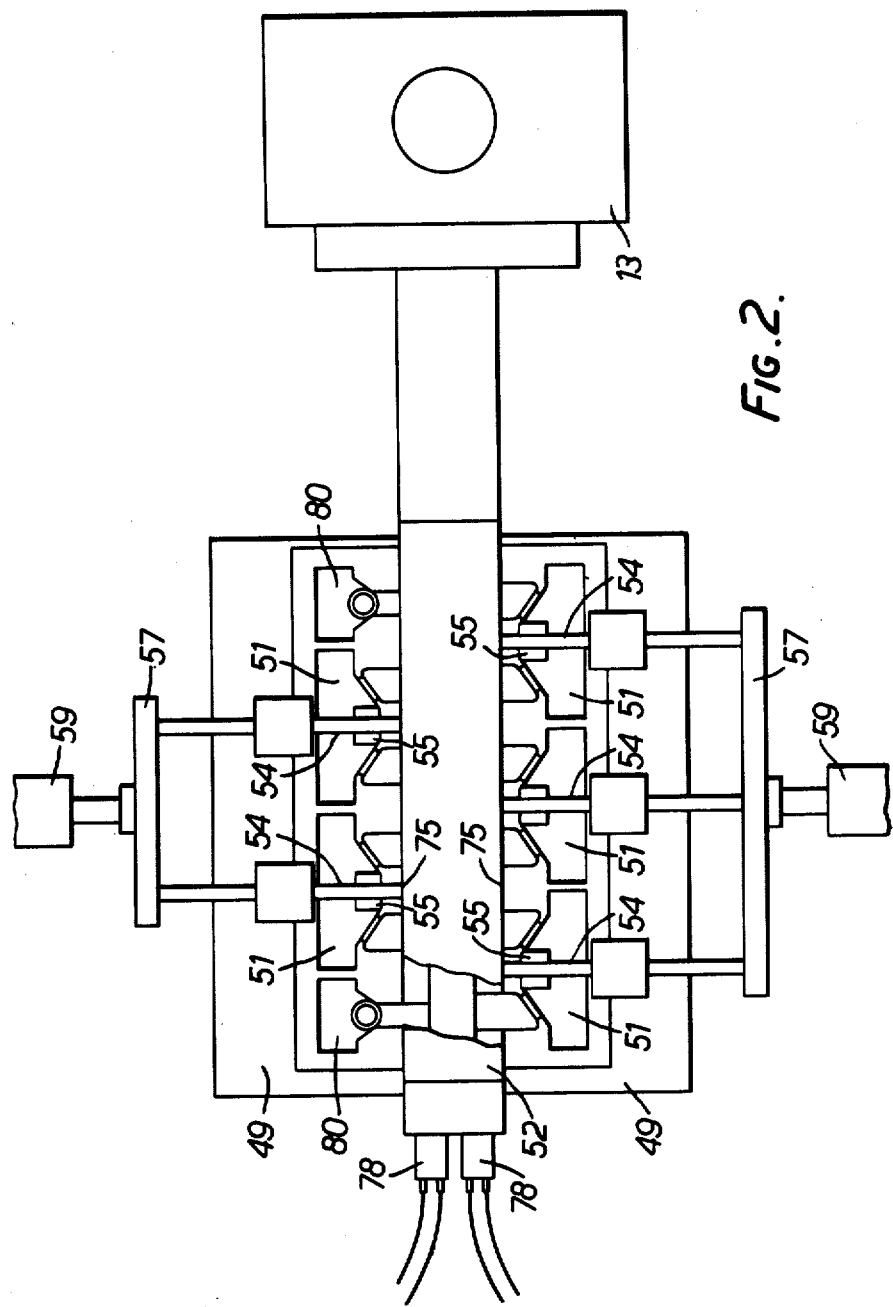

ACCUMULATOR PLATE ASSEMBLY METHODS

This invention relates to a method and apparatus for assembling battery plates.

The term "battery" is used herein to include accumulators. Electric batteries can have a variety of different electrodes and electrolytes. The electrodes are commonly metallic and the electrolytes liquid, although solid electrolytes and non-metallic conductive electrodes can also be used. The types of batteries known as accumulators usually have metal electrodes and acid electrolytes, the commonest form of accumulator being the lead-acid type which employs sulphuric acid electrolyte and lead electrodes.

In a conventional lead-acid battery, there are a number of separate stacks of parallel lead plates immersed in sulphuric acid, each stack having either negative or positive polarity. It is customary to connect together the plates of each stack by means of a lead strap or post which is fixed to aligned lugs or tabs on the plates. One of the chief difficulties in assembling the battery plates lies in connecting the plates to the lead strap or post as quickly as possible, and with the minimum waste of lead. The present invention aims to provide a simple, rapid and efficient method and apparatus for connecting the battery plates to such a strap or post.

Broadly stated, from one aspect the present invention consists in a method of connecting a battery plate to a metal strap or post, in which a portion of the plate is immersed in molten metal in a mould cavity filled from an adjacent molten metal duct and the metal in the cavity allowed to solidify, the cavity being cooled and the duct heated to provide a continuous temperature gradient between the duct and the cavity so as to aid rapid solidification of the metal in the cavity.

According to a further aspect of the invention, there is provided apparatus for connecting a battery plate to a metal strap or post, including a mould having at least one strap or post mould cavity and a molten metal duct adjacent thereto, and mould cavity being provided with cooling means and the duct being provided with heating means so as to create a continuous temperature gradient between the duct and cavity.

In a further apparatus aspect of the invention there is provided apparatus for connecting a battery plate to a metal strap or post, including a mould having at least one mould cavity and a molten metal duct adjacent thereto, and a barrier or weir separating the mould cavity and the duct so that metal can pass over the barrier or weir between the mould cavity and the duct, or vice versa.

Preferably, a thermal break is located between the duct and the cavity.

The invention may be performed in various ways, and one specific embodiment will now be described by way of example, with reference to the accompanying drawings, in which:

FIG. 2 is a plan view of the mould at the mould station;

In general, apparatus for connecting battery plates to lead straps or posts includes a battery plate loading station, a flux station and a lead strap or post mould station. The mould station includes a mould which communicates with a pump which is partially immersed in a tank containing molten lead.

Figure 6:
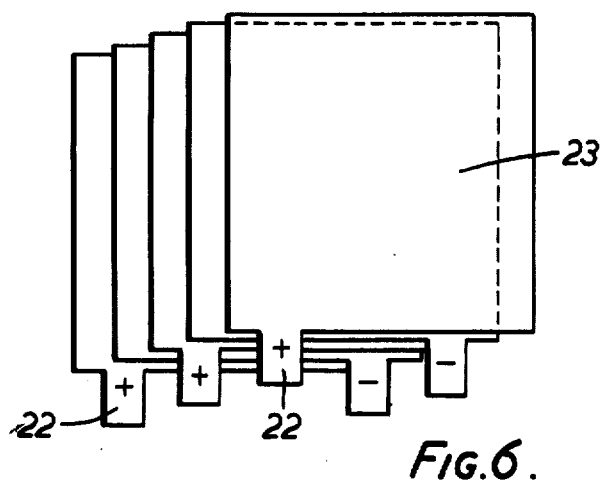
FIG. 6 is a general perspective view of a stack of battery plates.

Battery plates 23 are assembled at the loading station in the order shown in FIG. 6, and can be raised and lowered by a ram 34 and carried by a carriage 36 to the flux and mould stations.

The flux station includes a flux tank containing a molten flux material. The battery plates are lowered by the ram 34 towards the flux, so that only the lugs are immersed in the flux. The plates 23 are then raised by actuating the ram 34 and transported by the carriage 36 to the mould station 12 (see FIG. 1).

At the mould station 12, the plates 23 are lowered towards the mould 50 by the ram 34, and the descent of the plates 23 is so controlled that the lugs 22 are partially immersed in mould cavities 51 containing molten lead. Each cavity 51 contains sufficient lead to form one lead strap or post 63, FIG. 7.

Figure 1:
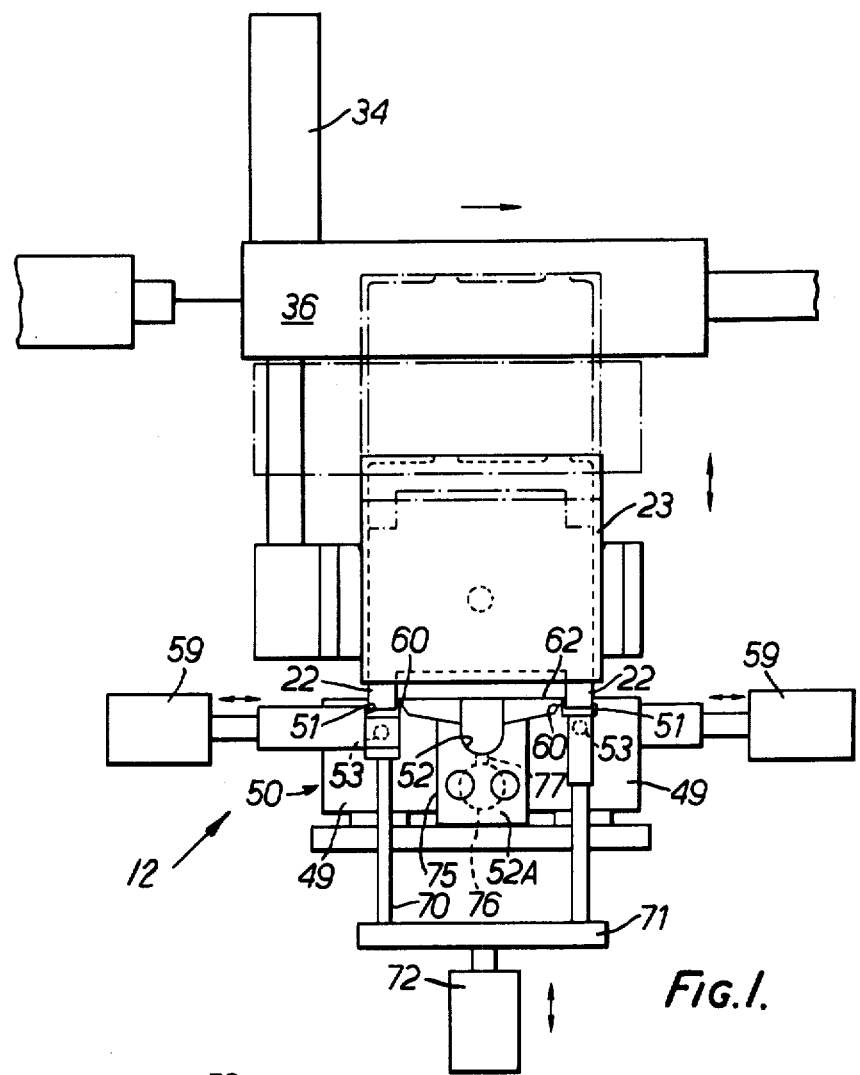
FIG. 1 is a diagrammatic side elevation of a mould station according to the invention for connecting battery plates to lead straps.
Figure 3:
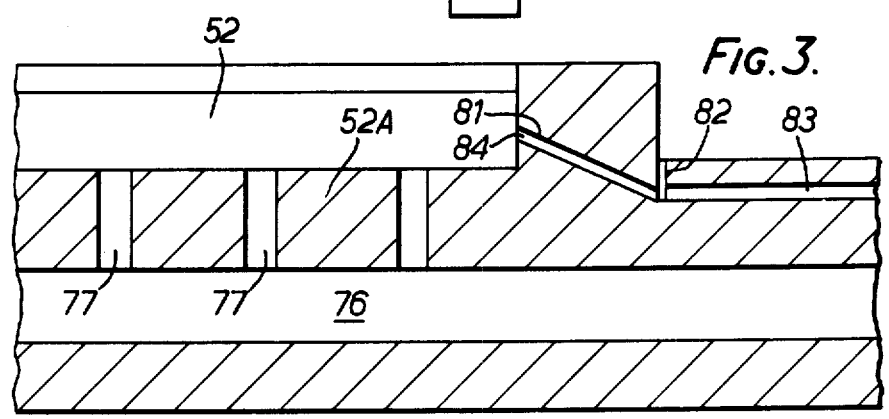
FIG. 3 is a diagrammatic longitudinal, vertical section through the mould station showing an overflow return system.

Referring to FIGS. 1 and 2, the mould 50 includes two metal blocks 49 provided with a number of separate mould cavities 51 arranged on each side of a duct or channel 52 for receiving molten lead. The duct or channel 52 is formed in a separate metal block 52A which contains electric heating elements 78 for maintaining lead in the channel in a molten state. Passages 53 (see FIG. 1) are formed in the body of the mould 50 beneath the cavities 51 to permit a flow of cooling water during the moulding process. A supply passage 76 is formed in the block 52A directly underneath and parallel with the duct 52, and communicates with the duct 52 via vertical connecting passages 77 spaced along the length of the duct. The advantage of this arrangement is that lead which is pumped directly into the passage 76 rises up the connecting passages 77 and fills the duct 52 uniformly without creating wave turbulence which might occur if the lead were pumped directly into duct 52. The mould cavities 51 can thus be filled gradually without the risk of wave turbulence affecting the final level of lead in the cavities.

Figure 7:
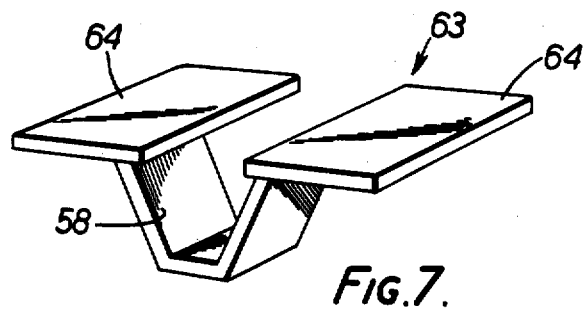
FIG. 7 is a perspective view of a lead strap formed in the mould of FIG. 2.
Figure 8:
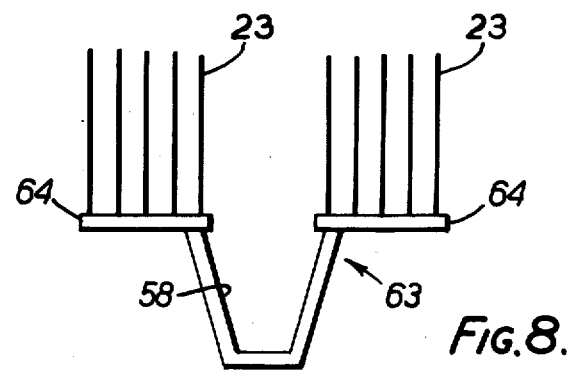
FIG. 8 is a side elevation of two stacks of battery plates connected to a strap.

The interfaces between the channel block 52A and the mould blocks 49 are cut away or otherwise provided with a layer of thermal insulation material 75 to act as a controlled thermal break or restrictor between the hot channel block 52A and the relatively cool mould blocks 49. This creates a continuous temperature gradient between blocks 49 and 52A. Each mould cavity 51 has twin shallow troughs connected by a well 55, and a slide bar 54 passes through the well 55 to form an inverted arch 58 between the troughs (see FIG. 7). Thus, molten lead which flows into a cavity 51 passes into the well 55 and under the slide bar 54 to connect together the twin troughs. The resulting moulded lead strap 63 includes a pair of parallel plates 64 connected by the arch 58, as shown in FIGS. 7 and 8. The end of each slide bar 54 remote from the cavity 51 is formed with a U-shaped recess which engages a horizontal bar 57 connected to a ram 59 which is actuated to move the bar 57 towards or away from the mould 50 in a horizontal plane.

As is shown in FIG. 1, between each mould cavity 51 and the channel 52 is positioned a weir or barrier 60 which determines the level of the molten lead in the mould cavity 51. An overflow return system is employed to maintain a constant level of lead in the duct 52 after the mould cavities 51 have been filled, and this system consists of an exit passage 81 formed in the end of the block 52A near the pump 13. A dump valve 82 is located at the end of the passage, and this communicates directly with the source tank of molten lead via a return passage 83. The dump valve is operated by a separate pneumatic cylinder (not shown).

The sequence of operations in the moulding process is as follows:

Molten lead is pumped into the supply passage 76 by pump 13 and during the pumping operation the lead rises up the channel 52 and then flows smoothly into the mould cavities 51 up to a level between the top 62 of the mould and the top of the weir 60. In order to obtain exactly the correct amount of lead in each cavity 51, the pump 13 sucks back some of the lead in the channel 52 so that the level of lead in the channel falls below the top of the weir or barrier 60. It will be appreciated that this will cause the level of lead in the cavities 51 to fall to the level of the top of the weir or barrier 60. At the same time as the pump 13 sucks back, the dump valve 82 is opened, and this allows lead in the channel 52 to drain back into the lead storage tank until it reaches the level 84 at the mouth of passage 81. If desired, the dump valve 82 can operate without any pump suck-back, in which case the lead level will still drain back to the level 84. The advantage of this overflow arrangement is that the lead in channel 52 is at a constant level at the beginning of each moulding cycle, which obviates the need for any measuring device for metering an exact amount of lead into the cavities 51. The system is thus self-correcting and the effect of inaccuracies in the amount of lead pumped during each cycle is eliminated.

After filling the cavities 51, the battery plates 23 are lowered by the rams 34 and the lugs 22 partially immersed in the lead-filled cavities. Due to the flow of cooling water through passages 53, the lead rapidly solidifies and is cast onto the lugs 22.

The slide bars 54 are now removed from the cavities 51 by moving the horizontal bars 57 away from the mould 50 and the complete assembly of battery plates 23 and their associated lead straps 64 can be removed from the mould by pushing ejector rods 70 against the lead straps, the rods 70 being carried by a plate 71 which is actuated by a hydraulic ram 72.

Once the assembly of plates and straps is removed from the mould 50, the slide bars 54 can be returned to their original position and the channel 52 can be refilled with lead from the pump 13.

As can be seen from FIG. 8, each plate 64 of a strap 63 is cast onto a separate stack of plates 23, so that each stack is spaced from the other by the arch 58.

When the two stacks and strap are positioned in a battery, the inverted arch 58 bridges a partition wall formed in the battery. This permits a series of stacks and straps to be arranged between the partition walls of the battery.

In addition to carrying mould cavities 51 for the lead straps the mould has two additional cavities 80 for the battery terminal connectors or posts. Since the terminal connectors 80 are not intended to bridge two stacks of battery plates they are not provided with slide bars 54.

Figure 4:
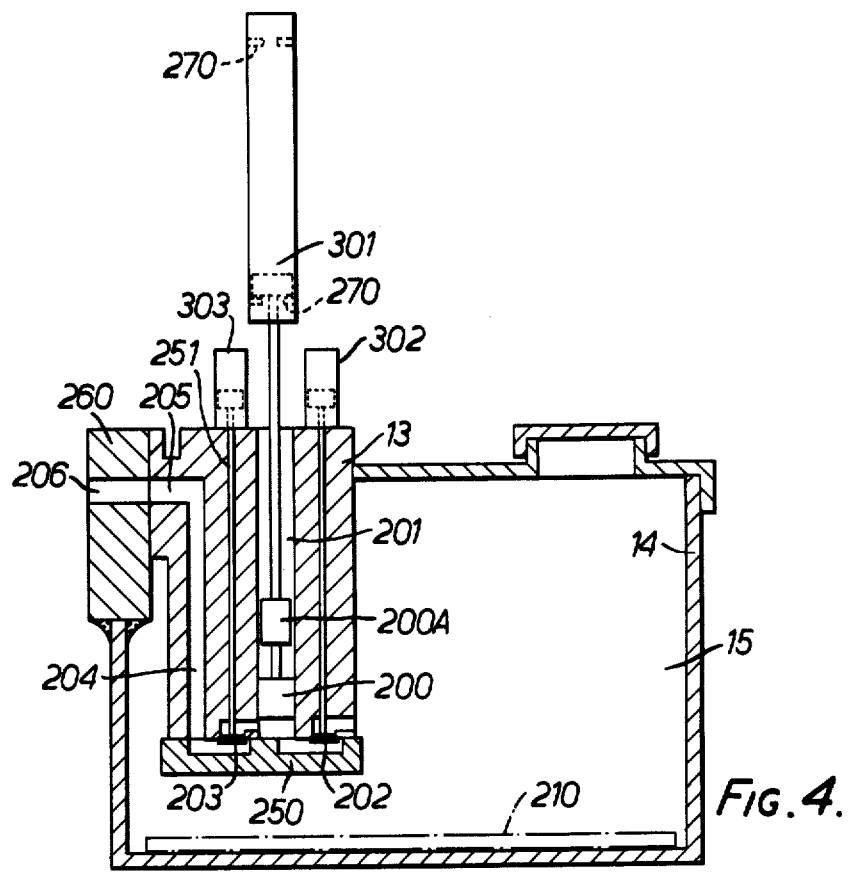
FIG. 4 is a vertical section through a pump and a tank containing molten lead.

The whole sequence of operations, from the alignment of the battery plates at the loading station to the formation of the finished assembly of plates and straps, can be carried out rapidly and with a minimum wastage of lead. There is no need to meter the amount of lead entering the mould cavities, since this is governed by the height of the barrier or weir, the overflow return system and/or the suck-back of the pump. Referring to FIG. 4, the pump is directly mounted on a support block 260 which is secured to one side of the tank 14 containing molten lead 15. The tank 14 contains electrical heating coils 210 for maintaining the lead in a molten state. The pump 13 comprises a metal body having a pump cylinder or bore 201 containing a reciprocating piston 200 attached to a pneumatic actuating ram 301 mounted above the pump body. The bottom end of the pump casing is closed by a plate 250 with co-operating inlet and exhaust valves 202 and 203 respectively attached to sliding stems 251 which extend upwards through drillings in the pump body and whose upper ends are attached to pneumatic actuating rams 302 and 303 respectively. The pneumatic ram 301 contains adjustable limit stops 270 for determining the stroke of the pump, and thus the volume of lead supplied. This may also be achieved by an adjustable link 200A in the bore 201.

The main discharge duct 204 from the pump leads vertically upwards to a horizontal passage 205 which, when the pump has been mounted on the support block 260, is directly aligned with a passage 206 through the block which communicates with the supply passage 76. The pump suck-back is achieved by means of a delay valve overlap system which is best understood by referring to FIG. 5 of the drawings.

Figure 5:
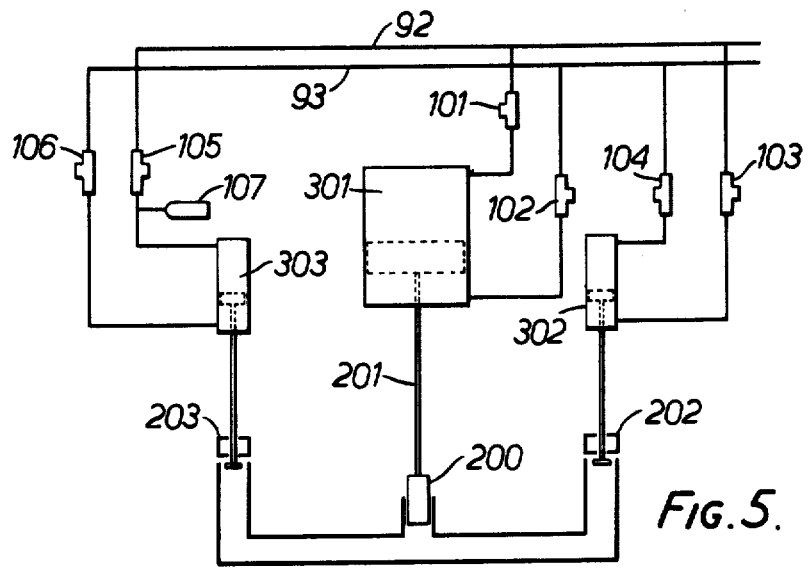
FIG. 5 is a pumping circuit diagram showing a delay valve overlap arrangement.

FIG. 5 shows the piston 200 and valves 202, 203 connected to two separate air-lines 92 and 93 via rams 301, 302 and 303. Between ram 301 and lines 92 and 93 are positioned air regulators 101 and 102 respectively. Similar air regulators 103 and 104 are positioned between ram 302 and the air lines and air regulators 105 and 106 are positioned between ram 303 and the air lines. A pressure bottle 107 is also located between ram 303 and air regulator 105.

All the air regulators permit air to actuate the piston and valve rams freely, but are adjusted for variable throttling of air exiting from the rams.

The pumping sequence beginning with the first pump upstroke is as follows:

Air line 93 is opened and air passes through regulator 102 and actuates ram 301 to raise the piston 200. At the same time, air passes through regulator 104 into ram 302 to open inlet valve 202. Molten lead from tank 14 thus enters the pump 13 through valve 202. At the end of the first upstroke of the piston 200, airline 93 is closed and airline 92 opened. The piston 200 then commences its downstroke, which causes the inlet valve 202 to close and outlet valve 203 to open so that lead can pass through valve 203 into the discharge duct 204, and hence into the supply passage 76. On the next upstroke of the piston 200, that is when airline 93 is opened and airline 92 is closed, the outlet valve 203 is maintained open for a short time by means of a pressure build-up in pressure bottle 107 which acts against air pressure produced by air flowing through regulator 106 into ram 303. At the same time, inlet valve 202 remains closed due to a pressure build-up between ram 302 and regulator 103. Airline 93 is also connected to the pneumatic cylinder which operates the dump valve 92, and the valve 82 opens during the upstroke of piston 200 to permit lead to drain away back to the tank 14. The throttle pressure limits in the air regulators can be adjusted so that when the pressure build-up in ram 303 is sufficient to close valve 203, valve 202 opens and lead is drawn in from the tank 14. The pumping cycle can then be repeated.

It will be appreciated that many different shapes of lead straps and posts can be produced by mould cavities of different shapes and sizes according to requirements.

It is also possible to provide each cavity 51 with a further barrier or weir, not dividing the channel 52 from the cavity, over which excess molten lead can drain into a sump or pot. This further weir could be, for example, on the side of the cavity opposite the weir 60.

According to a further aspect of the invention therefore, there is provided apparatus for stacking a plurality of objects between a pair of spaced parallel walls, in which each wall includes at least two parts which can be actuated to move in opposite directions, so as to reduce the gap between the walls and thereby clamp or otherwise hold in position objects in the gap.

Preferably, the apparatus includes three or more spaced walls to provide a plurality of compartments into each of which the objects can be placed.

I claim:

1. A method of casting a metal component and simultaneously attaching said component to a battery plate, comprising locating a portion of the plate in a mold cavity, supplying molten metal from one end into an elongated supply duct by means of a positive displacement pump to cause the level of metal in said duct to rise and the metal to spill over a weir into said cavity, continuously cooling the cavity and continuously heating the duct, and after filling the cavity removing molten metal from the same supply end of the duct by means of said positive displacement pump thereby to reduce the level of metal in the duct and to reduce the level of metal in the mold cavity back to the level of the weir, and after the metal in the cavity has solidified, removing the battery plate from the mold cavity with the cast metal component attached.

* * * * *